United States Patent [19]

Dew et al.

[11] Patent Number: 5,353,999
[45] Date of Patent: Oct. 11, 1994

[54] PARTICULATE AMORPHOUS PRECIPITATED SILICA

[75] Inventors: James T. Dew; Larry R. Evans, both of Jeannette; Walter H. Waddell, Pittsburgh, all of Pa.

[73] Assignee: PPG Industries, Inc., Pittsburgh, Pa.

[21] Appl. No.: 17,082

[22] Filed: Feb. 16, 1993

[51] Int. Cl.$^5$ .................................................. B02C 4/08
[52] U.S. Cl. ....................................... 241/30; 241/235
[58] Field of Search ............... 241/227, 228, 235, 236, 241/30, 229, 230, 231; 524/493

[56] References Cited

U.S. PATENT DOCUMENTS

| | | | |
|---|---|---|---|
| 3,622,083 | 11/1971 | Greenwald et al. | 241/227 |
| 3,738,785 | 6/1973 | Reinhardt et al. | 425/85 |
| 3,762,851 | 10/1973 | Reinhardt et al. | 425/223 |
| 4,807,819 | 2/1989 | Kreher | 241/228 |

OTHER PUBLICATIONS

"Precision Particle Reduction Equipment", Modern Process Equipment, Inc. Form 591-Jay.
"Series IMD 1042/1052 Cracking/Grinding Roll Mills", Modern Process Equipment, Inc. Date unknown.
Fischer Scientific 81, Complete Chemical Catalog, "FISHERbrand* U.S. Standard Sieves", p. 1083.
*Handbook of Chemistry*, 8th Ed., Handbook Publishers, Inc. Sandusky, Ohio, 1952, pp. 877–879.
*CRC Handbook of Chemistry and Physics*, 65th Ed., CRC Press, Inc., Boca Raton, Florida, 1984, p. F-110.

*Primary Examiner*—Edward Cain
*Attorney, Agent, or Firm*—George D. Morris

[57] ABSTRACT

A statistically large population of particles of amorphous precipitated silica is substantially free of particles of amorphous precipitated silica which are retained on a 20 mesh sieve screen, and is characterized by at least 90 percent by weight of said particles of said population being retained on a 200 mesh sieve screen. Such a population may be produced by cracking amorphous precipitated silica particles between the textured rolls of at least one roll pair.

11 Claims, No Drawings

PARTICULATE AMORPHOUS PRECIPITATED SILICA

Amorphous precipitated silicas are widely used materials having many uses. Examples of such uses include, but are not limited to, reinforcement in rubber goods, carriers of liquids, and anti-caking agents (viz., adsorbent of moisture) in spices.

Processes for producing amorphous precipitated silicas having various physical properties are widely known. Precipitated silicas are most commonly produced by precipitation from an aqueous solution of sodium silicate using a suitable acid such as sulfuric acid, hydrochloric acid, and/or carbon dioxide. Processes for producing amorphous precipitated silicas are described in detail in U.S. Pat. Nos. 2,657,149; 2,940,830; 4,495,167, 4,681,750, and 5,094,829.

Although both are silicas, it is important to distinguish amorphous precipitated silica from silica gel inasmuch as these different materials have different properties. Reference in this regard is made to R. K. Iler, *The Chemistry of Silica*, John Wiley & Sons, New York (1979), Library of Congress Catalog No. QD 181.S6144. Note especially pages 15–29, 172–176, 218–233, 364–365, 462–465, 554–564, and 578–579.

Silica gel is usually produced commercially at low pH by acidifying an aqueous solution of a soluble metal silicate, customarily sodium silicate, with acid. The acid employed is generally a strong mineral acid such as sulfuric acid or hydrochloric acid although carbon dioxide is sometimes used. Inasmuch as there is essentially no difference in density between the gel phase and the surrounding liquid phase while the viscosity is low, the gel phase does not settle out, that is to say, it does not precipitate. Silica gel, then, may be described as a non-precipitated, coherent, rigid, three-dimensional network of contiguous particles of colloidal amorphous silica. The state of subdivision ranges from large, solid masses to submicroscopic particles, and the degree of hydration from almost anhydrous silica to soft gelatinous masses containing on the order of 100 parts of water per part of silica, by weight, although the highly hydrated forms are only rarely used.

Amorphous precipitated silica is usually produced commercially by combining an aqueous solution of a soluble metal silicate, ordinarily alkali metal silicate such as sodium silicate, and an acid so that colloidal particles will grow in weakly alkaline solution and be coagulated by the alkali metal ions of the resulting soluble alkali metal salt. Various acids may be used, including the mineral acids and/or carbon dioxide. In the absence of a coagulant, silica is not precipitated from solution at any pH. The coagulant used to effect precipitation may be the soluble alkali metal salt produced during formation of the colloidal silica particles, it may be added electrolyte such as a soluble inorganic or organic salt, or it may be a combination of both.

Amorphous precipitated silica, then, may be described as precipitated aggregates of ultimate particles of colloidal amorphous silica that have not at any point existed as macroscopic gel during the preparation. The sizes of the aggregates and the degree of hydration may vary widely.

Amorphous precipitated silica powders differ from silica gels that have been pulverized in ordinarily having a more open structure, that is, a higher specific pore volume. However, the specific surface area of amorphous precipitated silica as measured by the Brunauer, Emmett, Teller (BET) method using nitrogen as the adsorbate, is often lower than that of silica gel.

Following precipitation and neutralization, the amorphous precipitated silica is usually washed and then dried. There are many ways to dry the precipitated silica. Examples of such procedures include tray drying in an oven, drying in a fluidized bed, and drying in a rotary dryer. A common procedure for drying an aqueous dispersion of the precipitated silica is by drying in a spray dryer in which the feed is sprayed into a column of moving hot air. These drying procedures and others are themselves well known to the art. The drying equipment is usually operated at outlet temperatures of at least about 100° C. although lesser temperatures may be employed when lesser evaporation rates can be accepted. In most cases the drying equipment is operated at an outlet temperature in the range of from about 100° C. to about 170° C. From about 100° C. to about 130° C. is preferred.

Substantially dry amorphous precipitated silica has the characteristics of a dry solid when handled. Such substantially dry precipitated silica is ordinarily not absolutely anhydrous but contains bound water (from about 2 to about 5 weight percent) and adsorbed water (from about 1 to about 7 weight percent) in varying amounts, the latter depending partly upon the prevailing relative humidity. Adsorbed water is that water which is removed from the silica by heating at 105° C. for 24 hours at atmospheric pressure in a laboratory oven. Bound water is that water which is removed by additionally heating the silica at calcination temperatures, for example, from about 600° C. to about 1200° C. The water content (including both adsorbed water and bound water) of the dry precipitated silica is usually less than about 12 percent by weight of the precipitated silica. Often the water content is less than about 9 percent by weight of the precipitated silica. Less than about 7 percent by weight is preferred.

There are many benefits to be obtained by using particles of amorphous precipitated silica which are smaller than those obtained from the fluidized bed, tray, or rotary drying operation. Substantially all amorphous precipitated silica particles obtained by spray drying pass through a 100 mesh sieve screen, and large amounts pass through a 200 mesh sieve screen. Size reduction of amorphous precipitated silica has been accomplished by many techniques including size reduction in fluid energy mills, roller mills, and hammer mills. Even when milling conditions are chosen so that particles of larger size are obtained, large amounts of amorphous precipitated silica dust are also produced. The presence of more than insignificant amounts of dust in the product is undesirable for many reasons, one of which is that dust promotes undesirable work environments and higher clean-up costs. The dusty powders produced by spray drying or milling are often granulated to reduce the dust content to acceptable levels either by compaction or by pelletizing as described in U.S. Pat. No. 5,091,132. Granulated materials, however, sometimes break up again as a result of further processing steps such as conveying and weighing, thus causing a dusty product.

As used herein and in the claims, unless otherwise qualified either expressly or contextually, "dust" means particles of amorphous precipitated silica which will pass through a 200 mesh sieve screen.

It has now been found that by cracking amorphous precipitated silica between at least one pair of textured rolls, amorphous precipitated silica particles of the desired smaller size can be produced without chemically altering the material while concurrent production of undesirable amorphous silica dust is markedly reduced. The amorphous precipitated silica may be cracked between only one pair of textured rolls or between more than one pair of textured roles, as is desired.

Accordingly, one embodiment of the invention is a method for reducing the size of amorphous precipitated silica particles, which method comprises cracking amorphous precipitated silica particles between the textured rolls of at least one roll pair.

In most instances the dust which is generated amounts to no more than 10 percent by weight of the product. Often the amount of dust produced by this cracking method is considerably less than 10 percent by weight. In many cases the amount of dust produced amounts to no more than 5 percent by weight of the product. Such dust as is generated at these levels can be removed from this new physical form of amorphous precipitated silica by using air elutriation or by screening, thereby resulting in a substantially dust-free product that is safer and easier to handle, and which processes easier in a variety of industrial applications. Air elutriation devices are well known and can be of the type made commercially by, for example, GE Environmental Systems or KICE Industries, Inc. The screening devices are also well known and are manufactured commercially by, for example, Rotex Inc., Kason Corp., and Sweco, Inc. In some instances the dust content of the cracked product is low enough that subsequent air elutriation or screening is not needed.

The present invention permits the benefits of small-sized amorphous precipitated silica particles to be realized while foregoing the detriments that the presence of more than insignificant quantities of particles of amorphous precipitated silica which are too small would incur. In addition, the amorphous precipitated silica produced in accordance with the invention is more easily handled due to its physical form. These advantages are general, and do not depend upon any particular end use.

Potential benefits of the amorphous precipitated silica particles produced in accordance with the invention to rubber applications are many and include one or more of the following: (i) easier handling of the amorphous precipitated silica particles of the invention, especially when processing rubber compositions on open mills, as compared with the handling of milled powdered amorphous precipitated silicas which can have dust problems; (ii) faster incorporation of the amorphous precipitated silica particles of the invention into rubber due to the lower dust content than milled powdered amorphous precipitated silicas; (iii) better dispersion of the amorphous precipitated silica particles of the invention into rubber compounds due to the much smaller average particle size compared to the much larger amorphous precipitated silica pellets obtained directly from dryers or by re-granulation; (iv) reduced rubber composition mixing times due to the ease of incorporation and dispersion of the amorphous precipitated silica particles of the invention; and/or (v) easier downstream rubber composition processing such as re-milling and extruding due to the better dispersion obtained with the amorphous precipitated silica particles of the invention.

Therefore, in a composition formed by admixing rubber and a statistically large population of particles of amorphous precipitated silica which are substantially free of particles of amorphous precipitated silica which are retained on a 20 mesh sieve screen, another embodiment of the invention is the improvement wherein at least 90 percent by weight of the particles of the population are retained on a 200 mesh sieve screen.

As used herein and in the claims, a "statistically large population of particles of amorphous precipitated silica" means that the number of particles constituting the population of particles of amorphous precipitated silica is at least large enough that when the population is arbitrarily divided into halves, the particle size distribution of one half is substantially the same as that of the other half.

Also as used herein and in the claims, values of sieve screen mesh (viz., meshes per inch) are made in reference to screens of the Tyler Sieve Screen Series.

At least 90 percent by weight of the amorphous precipitated silica particles of the statistical population in association with rubber in the rubber-containing composition of the invention are retained on a 200 mesh sieve screen. Often at least 93 percent by weight are retained on a 200 mesh screen. Frequently at least 95 percent by weight are retained on a 200 mesh screen. In many instances at least 98 percent by weight are retained on a 200 mesh screen. Preferably, substantially all of the amorphous precipitated particles of the statistical population are retained on a 200 mesh screen; that is to say, the population is substantially dust-free.

Examples of rubbers which may be used in the present invention include saturated rubbers such as butyl rubber (IIR), bromobutyl rubber (BIIR), chlorobutyl rubber (CIIR), hydrogenated nitrile rubber (HNBR), chlorosulfonated polyethylene (CSM), and terpolymers of ethylene-propylene with a diene rubber (EPDM) and general purpose diene rubbers such as natural rubber (NR), cis-polyisoprene (IR), chloroprene (CR), nitrile rubber (NBR), and polybutadiene (BR) and its copolymers containing styrene (SBR). One rubber or a mixture of different rubbers may be used as desired. Rubber products such as tires, shoes, hoses, belts, and mounts, for example, can thus benefit by use of the amorphous precipitated silica particles of the invention.

The amount of rubber present in the rubber-containing compositions of the invention may vary widely. In most instances rubber constitutes from 25 to 75 percent by weight of the composition. Often rubber constitutes from 35 to 65 percent by weight of the composition. From 45 to 60 percent by weight is preferred.

The amount of amorphous precipitated silica present in the rubber-containing compositions of the invention may vary widely. In most instances the amorphous precipitated silica is present in the composition in an amount in the range of from 1 to 100 parts per hundred parts by weight of the rubber present in the composition. Often the amorphous precipitated silica is present in the composition in an amount in the range of from 5 to 75 parts per hundred parts by weight of the rubber present in the composition. From 10 to 50 parts per hundred parts by weight of the rubber present in the composition is preferred.

Rubber compositions are normally cured with vulcanizing agents and accelerators. The curing conditions conventional and are those customarily and ordinarily employed in the art.

The method of the invention may conveniently, but not necessarily, be practiced using known processing equipment designed to crack other materials. The use of such equipment to crack particles of amorphous precipitated silica and the advantages to be obtained through such use, however, remained unknown until the present invention.

One class of known cracking machines can have one, two, three, or more horizontal sets of twin rolls (roll pairs) that are stacked one set on top of another. The gaps between the roll pairs of each set can be adjusted independently of the other pairs such that these gaps can become smaller as the amorphous precipitated silica particles fall from one set onto another set, which is a normal mode of operation. The speeds of the rolls constituting a set may be either equal or unequal. The texture of the rolls can be selected such that when larger amorphous precipitated silica particles are introduced to a roll pair, they become cracked into smaller particles. The axes of the rolls of a roll pair are usually substantially parallel. The rolls are textured with crests and valleys. The crests and valleys may be arranged in many ways such as, for example, in sinusoidal fashion, in sharktooth fashion, or in sawtooth fashion. The textures of the rolls of a roll pair can be the same or they can be different. Particularly effective arrangements are where the rolls are textured with crests and valleys in sharktooth or sinusoidal fashion. The rolls of a roll pair are arranged so that as they rotate, the crests of one roll do not intermesh with the valleys of the other. The crests and valleys may be arranged parallel to the axis of a roll, circumferentially, helically, or in helically segmented fashion. Roll gaps and roll speeds for a particular roll texture can be established so that the large amorphous precipitated silica particles are not completely pulverized as in current milling operations which form powdered, and therefore, dusty products. The precise conditions of operation depend upon such factors as roll texture, roll speed, numbers of roll pairs used, nature of the feedstock, and desired product particle sizes. The desired operating conditions for any particular situation can be quickly established empirically in a routine manner. Examples of known processing equipment which may be used to practice the method of the present invention include the CRACK-U-LIZER TM Model 88 K-8, Model 66K, Model 1042, and Model 1052 crackers, which can be single stage, two stage, or three stage crackers, all manufactured by Modern Process Equipment, Inc., Chicago, Ill.

The invention is further described in conjunction with the following examples which are to be considered illustrative rather than limiting, and in which all parts are parts by weight and all percentages are percentages by weight unless otherwise specified. The notation "phr" is an abbreviation for parts per hundred parts by weight of total rubber. A plus sign preceding a screen size denominated in mesh (viz., meshes per inch) is used in reference to particles retained by that screen; a minus sign is used in reference to particles which pass through the screen. Properties referred to in the Examples are identified in Table 1 together with the methods used for their determination.

TABLE 1

| Physical Test Methods | |
|---|---|
| Property | Method |
| Multi-Point BET Surface Area | ASTM D 1993-91 |
| Single Point BET Surface Area | ASTM D 3037-92 |
| DBP Oil Adsorption | ASTM D 2414-92 |
| Moisture Content | Percent weight loss at 105° C. |
| Mixing Time | ASTM D 3182-89 |
| Mixing Energy | ASTM D 3182-89 |
| Maximum Torque | ASTM D 2084-87 |
| Extrusion Rate | ASTM D 2230-90 |
| Die Swell | ASTM D 2230-90 |
| Scorch ($TS_2$) | ASTM D 2084-87. |
| Cure Time ($T_{90}$) | ASTM D 2084-87. |
| Tensile Properties | ASTM D 412-87 |
| Tensile Strength at Break | |
| Modulus | |
| Elongation at Break | |
| Shore A Hardness | ISO 4662. |
| Rebound | ISO 4662 |
| Edge Rating | ASTM D 2230-90 |

EXAMPLES 1–2

Amorphous precipitated silica pellets were made using carbon dioxide in the precipitation from sodium silicate step and hydrochloric acid in the neutralization of the amorphous precipitated silica step, and by drying in a rotary dryer to a final BET surface area (nitrogen single point) of 150 m²/g. Oversized chunks (+6 mesh) were removed by screening to form the −6 mesh amorphous precipitated silica pellets of Control 1. A portion of the Control 1 pellets were milled in a roller mill to form the amorphous precipitated silica powder of Control 2. A portion of Control 2 was compacted into granules to form the amorphous precipitated silica granules of Control 3. One portion of the amorphous precipitated silica pellets of Control 1 was cracked between the rolls of a single roll pair of a CRACK-U-LIZER TM Model 66K two stage cracker to form the amorphous precipitated silica particles of Example 1. The rolls had the same diameter and the same sharktooth roll texture of 22 cuts per 2.54 centimeters, and were rotated at relative peripheral speeds of 1.8:1. Another portion of the amorphous precipitated silica pellets of Control 1 was cracked between the rolls of two roll pairs to form the amorphous precipitated particles of Example 2. Within each roll pair the rolls had the same diameter and roll texture, and were rotated at relative peripheral speeds of 1.8:1. Particle size distributions of the various physical forms were determined by screening using sieve screens of progressively smaller mesh. Gap settings between the rolls of the roll pairs and the data are shown in Table 2.

TABLE 2

| | Top/Bottom Gap Setting, mm | Silica Particle Size Distribution, weight percent, noncumulative | | | | | | |
|---|---|---|---|---|---|---|---|---|
| | | Screen Size, mesh | | | | | | |
| | | +20 | +50 | +70 | +100 | +140 | +200 | −200 |
| Example 1 | 0.635/—[a] | 2 | 77 | 8 | 4 | 5 | 1 | 3 |
| Example 2 | 0.635/0.178 | 0 | 8 | 34 | 25 | 19 | 6 | 8 |
| Control 1[b] | Not Cracked | 71 | 24 | 2 | 0 | 1 | 0 | 1 |
| Control 2[c] | Not Cracked | 0 | 0 | 0 | 0 | 0 | 0 | 100[d] |

TABLE 2-continued

| Top/Bottom Gap Setting, mm | Silica Particle Size Distribution, weight percent, noncumulative | | | | | | |
|---|---|---|---|---|---|---|---|
| | Screen Size, mesh | | | | | | |
| | +20 | +50 | +70 | +100 | +140 | +200 | −200 |
| Control 3[e]   Not Cracked | 76 | 21 | 0 | 1 | 0 | 1 | 1 |

[a]The bottom roll pair was completely open.
[b]Hi-Sil ® 210 Pellets, PPG Industries Inc.
[c]Hi-Sil ® 233 Powder, PPG Industries Inc.
[d]100% passes through a 325 mesh screen.
[e]Hi-Sil ® 243LD Granules, PPG Industries Inc.

The data show that amorphous precipitated silica cracked in accordance with the invention affords significantly smaller particle sizes than the uncracked pellets of Control 1.

EXAMPLES 3–6

Amorphous precipitated silica pellets were made using sulfuric acid in the precipitation and neutralization steps, and by drying in a rotary dryer to a final BET surface area (nitrogen single point) of 185 m$^2$/g to form the amorphous precipitated pellets of Control 4. One portion of the amorphous precipitated silica pellets of Control 4 was cracked between the rolls of a single roll pair of a CRACK-U-LIZER ™ Model 66K two stage cracker to form the amorphous precipitated silica particles of Example 3. The rolls had the same diameter and roll texture, and were rotated at relative peripheral speeds of 1.8:1. Another portion of the amorphous precipitated silica pellets of Control 4 was cracked between the rolls of two roll pairs of the same machine to form the amorphous precipitated silica particles of Example 4. Within each roll pair the rolls had the same diameter and roll texture, and were rotated at relative peripheral speeds of 1.8:1. Particle size distributions of the various physical forms were determined by screening using sieve screens of progressively smaller mesh. Gap settings between the rolls of the roll pairs and the data are shown in Table 3.

TABLE 3

| | Top/Bottom Gap Setting, mm | Silica Particle Size Distribution, weight percent, noncumulative | | | | | | |
|---|---|---|---|---|---|---|---|---|
| | | Screen Size, mesh | | | | | | |
| | | +20 | +50 | +70 | +100 | +140 | +200 | −200 |
| Example 3 | 0.508/—[a] | 0 | 74 | 12 | 1 | 7 | 1 | 4 |
| Example 4 | 0.508/0.203 | 0 | 5 | 45 | 19 | 19 | 3 | 9 |
| Control 4 | Not Cracked | 87 | 13 | 1 | 0 | 0 | 0 | 0 |

[a]The bottom roll pair was completely open.

The data show that amorphous precipitated silica cracked in accordance with the invention, Examples 3–4, affords significantly smaller particle sizes than the uncracked pellets of Control 4. The data also show that the use of one roll pair altered the particle size distribution to provide small particles of amorphous precipitated silica which contained a very low amount of dust.

The data further show that use of a second roll pair further reduced particle sizes.

EXAMPLES 5–7

Two portions of the amorphous precipitated silica pellets of Control 1, above, were cracked between the rolls of two roll pairs of a CRACK-U-LIZER ™ Model 66K two stage cracker to form the amorphous precipitated silica particles of Examples 5 and 6, and a portion of the amorphous precipitated silica pellets of Control 4, above, was cracked between the rolls of two roll pairs of a CRACK-U-LIZER ™ Model 66K two stage cracker to form the amorphous precipitated silica particles of Example 7. Within each roll pair, the rolls had the same diameter and roll texture, and were rotated at the relative peripheral speeds of 1.8:1. Gap settings between the rolls of the roll pairs were not varied. Particle size distributions of the various physical forms were determined by screening using sieve screens of progressively smaller mesh. The nitrogen single point BET surface areas, the gap settings, and the data are shown in Table 4.

TABLE 4

| | Single Point BET Surface Area, m$^2$/g | Top/Bottom Gap Setting, mm | Silica Particle Size Distribution, weight percent, noncumulative | | | | | | |
|---|---|---|---|---|---|---|---|---|---|
| | | | Screen Size, mesh | | | | | | |
| | | | +20 | +50 | +70 | +100 | +140 | +200 | −200 |
| Example 5 | 150 | 0.533/0.305 | 0 | 37 | 31 | 14 | 9 | 4 | 6 |
| Example 6 | 150 | 0.533/0.305 | 0 | 36 | 31 | 13 | 10 | 3 | 8 |
| Example 7 | 185 | 0.533/0.305 | 0 | 34 | 30 | 13 | 11 | 4 | 9 |

The data show that the distribution of particle sizes obtained by cracking amorphous precipitated silica in accordance with the present invention is substantially independent of both the acid ingredients used during precipitation and neutralization of the amorphous precipitated silica manufacture of silica and the nitrogen single point BET surface areas of the amorphous precipitated silicas which are cracked.

EXAMPLES 8–11

A portion of the amorphous precipitated silica pellets of Control 1, above, was cracked between the rolls of a single roll pair of a CRACK-U-LIZER ™ Model 66K two stage cracker to form the amorphous precipitated silica particles of Example 8. The rolls had the same diameter and coarse sharktooth roll texture, and were rotated at relative peripheral speeds of 1.8:1. Other portions of the amorphous precipitated silica pellets of Control 1, above, were cracked between the rolls of a single roll pair of a CRACK-U-LIZER ™ Model 66K two stage cracker to form the amorphous precipitated silica particles of Examples 9-11. The rolls had the same diameter and increasingly finer roll textures, and were rotated at relative peripheral speeds of 1.8:1. Gap settings between the rolls of the roll pairs were not varied. The roll textures of the rolls of the two roll pairs differed only in the number of grooves per 2.54 centimeters. Particle size distributions of the various physical forms were determined by screening using sieve screens of progressively smaller mesh. The roll textures, the gap settings, and the data are shown in Table 5.

were the same, but the types of texture differed between roll pairs. Each roll of each roll pair had 30 grooves per 2.54 centimeters. Particle size distributions of the various physical forms were determined by screening using sieve screens of progressively smaller mesh. The types of roll textures, the gap settings, and the data are shown in Table 6.

TABLE 6

| | Roll Texture Type | Top/Bottom Gap Setting, mm | Silica Particle Size Distribution, weight percent, noncumulative | | | | | | |
|---|---|---|---|---|---|---|---|---|---|
| | | | Screen Size, mesh | | | | | | |
| | | | +20 | +50 | +70 | +100 | ±140 | +200 | −200 |
| Example 12 | Sharktooth | 0.279/—a | 0 | 42 | 28 | 13 | 7 | 3 | 7 |
| Example 13 | Sinusoidal | 0.279/—a | 0 | 63 | 18 | 7 | 4 | 3 | 4 | aThe bottom roll pair was completely open.

The data show that the distribution of particle sizes obtained by cracking amorphous precipitated silica in accordance with the present invention can be varied by varying the texture of the rolls.

EXAMPLES 14-17

Four portions of the amorphous precipitated silica pellets of Control 1, above, were cracked between the rolls of two roll pairs of a CRACK-U-LIZER ™ Model 66K two stage cracker to form the amorphous precipitated silica particles of Examples 14-17, respec-

TABLE 5

| | Roll Texturea | Top/Bottom Gap Setting, mm | Silica Particle Size Distribution, weight percent, noncumulative | | | | | | |
|---|---|---|---|---|---|---|---|---|---|
| | | | Screen Size, mesh | | | | | | |
| | | | +20 | +50 | +70 | +100 | +140 | +200 | −200 |
| Example 8 | 20 | 0.279/—b | 0 | 52 | 22 | 11 | 6 | 3 | 6 |
| Example 9 | 30 | 0.279/—b | 0 | 42 | 28 | 13 | 7 | 3 | 7 |
| Example 10 | 40 | 0.279/—b | 0 | 25 | 37 | 18 | 8 | 4 | 8 |
| Example 11 | 50 | 0.279/—b | 0 | 23 | 37 | 17 | 9 | 5 | 10 |
| Control 1 | — | Not Cracked | 71 | 24 | 2 | 0 | 1 | 0 | 1 | aGrooves per 2.54 centimeters.
bThe bottom roll pair was completely open.

The data show that cracking amorphous precipitated silica according to the present invention using rolls having a finer texture, produces an amorphous precipitated silica product having a higher percentage of finer particles than when rolls of coarser texture are employed.

EXAMPLES 12-13

Two portions of the amorphous precipitated silica pellets of Control 1, above, were cracked between the rolls of two roll pairs of a CRACK-U-LIZER ™ Model 66K two stage cracker to form the amorphous precipitated silica particles of Examples 12 and 13, respectively. Within each roll pair, the rolls had the same diameter and were rotated at relative peripheral speeds of 1.8:1. Gap settings between the rolls of the roll pairs were not varied. The textures of the rolls of a roll pair tively. Within each roll pair, the rolls had the same diameter and roll texture, and were rotated at the relative peripheral speeds of 1.8:1. Gap settings between the rolls of the roll pairs were varied. Particle size distributions of the various physical forms were determined by screening using sieve screens of progressively smaller mesh. The gap settings and the data are shown in Table 7.

TABLE 7

| | Top/Bottom Gap Setting, mm | Silica Particle Size Distribution, weight percent, noncumulative | | | | | | |
|---|---|---|---|---|---|---|---|---|
| | | Screen Size, mesh | | | | | | |
| | | +20 | +50 | +70 | +100 | +140 | +200 | −200 |
| Example 14 | 0.483/0.254 | 0 | 22 | 35 | 20 | 10 | 4 | 10 |
| Example 15 | 0.533/0.305 | 0 | 36 | 31 | 13 | 10 | 3 | 8 |
| Example 16 | 0.584/0.356 | 0 | 53 | 22 | 11 | 7 | 2 | 5 |
| Example 17 | 0.635/0.406 | 0 | 58 | 19 | 9 | 6 | 3 | 5 |

The data show that cracking amorphous precipitated silica silica in accordance with the invention but using differing gap settings between the rolls of the roll pairs produced particles of differing particle size distributions, and that increasing the roll gaps produces amorphous precipitated silica products of increasing size. The data further show that the quantity of dust produced is also controlled by the roll gap settings.

EXAMPLES 18-19

Two fractions of amorphous precipitated silica particles having differing particle size distributions were obtained by cracking a portion of the amorphous precipitated silica pellets of Control 1, above, and screening the cracked material. Both fractions and Control 1 were tested for physical and chemical properties. The data are shown in Table 8.

TABLE 8

| | Silica Properties | | | |
|---|---|---|---|---|
| | Screen Size, mesh | Single Point BET Surface Area, m²/g | DBP Oil Adsorption | pH | Moisture Content, wt % |
| Example 18 | −30/+70 | 149 | 192 | 6.6 | 6.6 |
| Example 19 | −70/+140 | 146 | 195 | 6.7 | 7.2 |
| Control 6 | Not Cracked | 148, 152 | 185, 191 | 6.6 | 6.8 |

The data show that there is no change in silica physical and chemical properties upon cracking pellets according to the invention.

EXAMPLES 20-25

Fractions of amorphous precipitated silica particles having differing particle size distributions were obtained by cracking a portion of the amorphous precipitated silica pellets of Control 1, above, in accordance with the invention and screening the cracked material. The fractions and Control 1 were tested for surface area and oil adsorption. The data are shown in Table 9.

TABLE 9

| | Silica Properties | | |
|---|---|---|---|
| | Screen Size, mesh | Single Point BET Surface Area, m²/g | DBP Oil Adsorption |
| Example 20 | −30/+50 | 145 | 193 |
| Example 21 | −50/+70 | 145 | 195 |
| Example 22 | −70/+100 | 151 | 193 |
| Example 23 | −100/+140 | 151 | 193 |
| Example 24 | −140/+200 | 152 | 193 |
| Example 25 | −200 | 148 | 200 |
| Control 1 | Not Cracked | 148, 152 | 185, 191 |

The data show that there is no change in silica physical and chemical properties upon cracking pellets into fine particles according to the invention.

EXAMPLES 26-30

Fractions of amorphous precipitated silica particles having differing particle size distributions were obtained by cracking a portion of the amorphous precipitated silica pellets of Control 1, above, in accordance with the invention and screening the cracked material. These fractions and the pellets of Control 1, the milled powder of Control 2, and the granules of Control 3, all described above, were tested for dispersion in a standard rubber formula shown in Table 10. Ingredients were admixed in an internal Brabender mixer by adding in the order and at the times shown and mixing for four minutes total. Mixed rubber compounds were milled into three sheets with gauges of 1.25 mm, 0.60 mm and 0.30 mm thickness. The number of white silica particles remaining undispersed in the rubber sheets were observed through a 10× magnifying microscope. Lower numbers of observed silica particles are considered indicative of better dispersion in rubber. The data are shown in Table 11.

TABLE 10

| Rubber Formulation for Testing Dispersion of Silica | | |
|---|---|---|
| Ingredient | Weight, grams | Addition Time, minutes |
| Butyl Rubber, 365 | 147 | 0 |
| Iron Oxide/Rubber Masterbatch | 9 | 0 |
| Amorphous Precipitated Silica | 32.5 | 1 |
| Processing Oil | 7.5 | 2 |
| Amorphous Precipitated Silica | 52.5 | 2 |

TABLE 11

| Number of Undispersed White Silica Particles per Unit Area | | | |
|---|---|---|---|
| | Screen Size, mesh | Sheet Thickness, mm | |
| | | 1.25 | 0.6 | 0.3 |
| Example 26 | −30/+50 | 0 | 0 | 60 |
| Example 27 | −50/+70 | 0 | 0 | 87 |
| Example 28 | −70/+100 | 0 | 0 | 14 |
| Example 29 | −100/+140 | 0 | 0 | 1 |
| Example 30 | −140/+200 | 0 | 0 | 1 |
| Control 1 | Not Cracked | 0 | 0 | 130 |
| Control 2 | Not Cracked | 0 | 0 | 1 |
| Control 3 | Not Cracked | 0 | 0 | 8 |

The data show that all amorphous precipitated silica fractions cracked in accordance with the invention have a better rubber dispersion ratings (lower numbers of observed particles per unit area) than the pellets of Control 1. The data further show that the −100/+140 mesh fraction and the −140/+200 mesh fraction have rubber dispersion ratings equal to that of the smaller-sized milled powder of Control 2.

EXAMPLES 31-32

Fractions of amorphous precipitated silica particles having differing particle size distributions were obtained by cracking a portion of the amorphous precipitated silica pellets of Control 1, above, in accordance with the invention and screening the cracked material. These fractions and the pellets of Control 1 were tested for energy of mixing and Garvey die extrusion in a standard rubber formula shown in Table 12. Ingredients were admixed in an internal Brabender mixer according to ASTM D3182-87 by adding the first seven ingredients in the order and in the amounts specified and mixing for a total of four minutes, then in a second mixing step adding the final three ingredients and mixing for two minutes. The results of energy of mixing testing are shown in Table 13, those of Garvey Die extrusion testing are shown in Table 14, and those of physical testing are shown in Table 15.

TABLE 12

| Rubber Formulation for Testing Mixing | |
|---|---|
| Ingredient | Amount, phr |
| Natural Rubber | 70 |
| Styrene-Butadiene Rubber | 30 |
| Silica | 45 |
| Naphthenic Oil | 17.5 |
| Butylated Bisphenol | 0.75 |

TABLE 12-continued

Rubber Formulation for Testing Mixing

| Ingredient | Amount, phr |
|---|---|
| Stearic Acid | 1.5 |
| Zinc Oxide | 4 |
| Sulfur | 2 |
| Benzothiazyl Disulfide | 2.5 |
| 1,3-Diphenylguanidine | 0.8 |

TABLE 13

Energy of Mixing Rubber Formulations

| | Screen Size, mesh | Maximum Torque, Nm | Relative Energy of Mixing | Dispersion Ranking |
|---|---|---|---|---|
| Example 31 | −70/+140 | 10.4 | 35 | 1 (Best) |
| Example 32 | −20/+70 | 10.5 | 34 | 2 |
| Control 1 | Not Cracked | 10.5 | 34 | 3 |

The data show that the amorphous precipitated silica fractions cracked in accordance with the invention have improved dispersability in rubber at the same mixing energy input into the rubber compositions.

TABLE 14

ASTM D 2230 Extrusion Ratings

| | Screen Size, mesh | Mix1/Mix2 Mixing Time, min | Edge Rating | Extrusion Rate, mm/min | Swell, % Height | Swell, % Width |
|---|---|---|---|---|---|---|
| Example 32 | −20/+70 | 4/2 | 8 | 816 | 7.0 | 28.1 |
| Control 1 | Not Cracked | 4/2 | 7 | 720 | 9.5 | 29.3 |

The data show that amorphous precipitated silica cracked in accordance with the invention provided higher edge ratings (viz., appearance) and lower die swells at faster extrusion rates than did the pellets of Control 1.

TABLE 15

| | $TS_2$ Scorch, min | $T_{90}$ Cure, min | 300% Modulus, MPa | Break Strength, MPa | Strain at Break, % | Hardness Shore A | Rebound, % |
|---|---|---|---|---|---|---|---|
| Example 31 | 2.8 | 6.0 | 3.4 | 23.0 | 722 | 60 | 55.6 |
| Example 32 | 2.8 | 7.2 | 3.3 | 23.0 | 731 | 58 | 54.6 |
| Control 1 | 2.2 | 6.5 | 3.3 | 23.0 | 719 | 59 | 55.4 |

The data show that cured rubber compositions prepared with the amorphous precipitated silica fractions cracked in accordance with the invention afford equivalent physical properties to compounds prepared using the pellets of Control 1.

Although the present invention has been described with reference to specific details of certain embodiments thereof, it is not intended that such details should be regarded as limitations upon the scope of the invention except insofar as they are included in the accompanying claims.

We claim:

1. A method for reducing the size of amorphous precipitated silica particles, which method comprises cracking amorphous precipitated silica particles between the textured rolls of at least one roll pair wherein said rolls are textured with crests and valleys and wherein the crests and valleys of one roll of said roll pair do not intermesh with the crests and valleys of the other roll of said roll pair.

2. The method of claim 1 wherein the axes of said rolls of said roll pair are substantially parallel.

3. The method of claim 1 wherein said rolls of said roll pair rotate at the same peripheral speed.

4. The method of claim 1 wherein said rolls of said roll pair rotate at different peripheral speeds.

5. The method of claim 1 wherein said crests and valleys of at least one of said rolls of said roll pair are arranged parallel to the axis of that roll.

6. The method of claim 1 wherein said crests and valleys of at least one of said rolls of said roll pair are arranged circumferentially.

7. The method of claim 1 wherein said crests and valleys of at least one of said rolls of said roll pair are arranged helically.

8. The method of claim 1 wherein said crests and valleys of at least one of said rolls of said roll pair are arranged in helically segmented fashion.

9. The method of claim 1 wherein at least one of said rolls is textured with crests and valleys in sinusoidal fashion.

10. The method of claim 1 wherein at least one of said rolls is textured with crests and valleys in sharktooth fashion.

11. The method of claim 1 wherein at least one of said rolls is textured with crests and valleys in sawtooth fashion.

* * * * *

UNITED STATES PATENT AND TRADEMARK OFFICE
CERTIFICATE OF CORRECTION

PATENT NO. : 5,353,999
DATED     : October 11, 1994
INVENTOR(S) : James T. Dew et al It is certified that error appears in the above-indentified patent and that said Letters Patent is hereby corrected as shown below:

On the title page, item [56] should be added:
"References Cited, U.S. PATENT DOCUMENTS".

| | | |
|---|---|---|
| 3,441,387 | 04/69 | Dye............23/313 |
| 4,603,143 | 07/86 | Schmidt........514/458 |
| 4,617,294 | 10/86 | Krivak et al...514/52 |
| 4,717,561 | 01/88 | Krivak et al...425/335 |
| 5,091,132 | 02/92 | Haller........264/117 |

Signed and Sealed this

Sixteenth Day of April, 1996

BRUCE LEHMAN

*Attest:*

*Attesting Officer*          *Commissioner of Patents and Trademarks*